US008984252B2

(12) United States Patent
Dudgeon et al.

(10) Patent No.: US 8,984,252 B2
(45) Date of Patent: Mar. 17, 2015

(54) EXTENT CONSOLIDATION AND STORAGE GROUP ALLOCATION

(75) Inventors: Kyle Barret Dudgeon, Vail, AZ (US);
Miguel Angel Perez, Vail, AZ (US);
David Charles Reed, Tucson, AZ (US);
Max Douglas Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1628 days.

(21) Appl. No.: 12/358,182

(22) Filed: Jan. 22, 2009

(65) Prior Publication Data

US 2010/0185829 A1    Jul. 22, 2010

(51) Int. Cl.
G06F 12/02     (2006.01)
G06F 3/06      (2006.01)

(52) U.S. Cl.
CPC ............ *G06F 3/0644* (2013.01); *G06F 3/0608* (2013.01); *G06F 3/0689* (2013.01)
USPC .................................. 711/202; 711/E12.014

(58) Field of Classification Search
None
See application file for complete search history.

(56) References Cited

U.S. PATENT DOCUMENTS

| 6,098,074 | A | 8/2000 | Cannon et al. | |
|---|---|---|---|---|
| 6,453,383 | B1 | 9/2002 | Stoddard et al. | |
| 6,735,603 | B2 * | 5/2004 | Cabrera et al. | 713/100 |
| 7,181,481 | B2 | 2/2007 | Chen et al. | |
| 2004/0205092 | A1 * | 10/2004 | Longo et al. | 707/205 |
| 2007/0260834 | A1 | 11/2007 | Kavuri et al. | |
| 2008/0077762 | A1 * | 3/2008 | Scott et al. | 711/170 |

FOREIGN PATENT DOCUMENTS

JP        59146355 A      8/1984

* cited by examiner

*Primary Examiner* — Charles Rones
*Assistant Examiner* — Ryan Dare
(74) *Attorney, Agent, or Firm* — Rabindranath Dutta; Konrad Raynes Davda & Victor LLP

(57) ABSTRACT

Data is added to a data set to cause a growth in size of the data set, wherein the data set belongs to a storage group, and wherein the data set is comprised of extents. The data set is included into a new storage group, in response to determining that the growth in the size of the data set has caused a predetermined threshold for a size limit of the storage group to be exceeded. The extents of the data set are restructured to satisfy a predetermined condition on the extents of the data set, in response to determining that the growth in the size of the data set has caused the predetermined condition on the extents included in the data set to be not satisfied.

16 Claims, 4 Drawing Sheets

EXTENT CONSOLIDATION AND STORAGE GROUP ALLOCATION

BACKGROUND

1. Field

The disclosure relates to a method, a system, an article of manufacture, and a method for deploying computing infrastructure for extent consolidation and storage group allocation.

2. Background

An operating system that executes on a computing system may allow a large number of data sets, such as files, to be stored in storage that is coupled to the computing system. A data set may be stored in one or more storage volumes, wherein each storage volume may be comprised of one or more segments, and wherein a segment may be referred to as an extent.

The plurality of data sets may be grouped into a plurality of storage groups, wherein each storage group may include one or more data sets selected from the plurality of data sets. A storage management system may manage the plurality of storage groups, the data sets, the storage volumes, and the extents.

SUMMARY OF THE PREFERRED EMBODIMENTS

Provided are a method, a system, an article of manufacture, and a method for deploying computing infrastructure, wherein data is added to a data set to cause a growth in size of the data set, wherein the data set belongs to a storage group, and wherein the data set is comprised of extents. The data set is included into a new storage group, in response to determining that the growth in the size of the data set has caused a predetermined threshold for a size limit of the storage group to be exceeded. The extents of the data set are restructured to satisfy a predetermined condition on the extents of the data set, in response to determining that the growth in the size of the data set has caused the predetermined condition on the extents included in the data set to be not satisfied.

In further embodiments, a determination is made that the data set is a single volume data set. A further determination is made that the predetermined condition on the extents is a threshold that indicates a maximum number of allowable extents for the single volume data set, in response to determining that the data set is the single volume data set.

In yet further embodiments, a determination is made that the data set is a multi-volume data set. A further determination is made that the predetermined condition on the extents is a threshold that indicates an average number of allowable extents per volume, in response to determining that the data set is the multi-volume data set.

In additional embodiments, a determination is made that the data set is being closed, prior to including the data set into the new storage group. Additionally a determination is made that that the data set is being closed, prior to restructuring the extents of the data set.

In yet additional embodiments, the restructuring of the extents of the data set further comprises copying the data set to a new data set, and changing size or number of extents in the new data set to satisfy the predetermined condition on the extents.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Impact of Growth of Data Sets on Extents and Groups

A data set is a logical storage repository for data. An exemplary data set that may be used in certain operating systems is a file. A data set may grow for various reasons. For example, a data set may grow when new data is added to the data set. As data sets grow over time, the data sets may become extended into a plurality of segments, wherein each segment may be referred to as an extent.

The plurality of extents may lead to fragmentation in the volume and in the storage group corresponding to the volume. Users may run defragmentation jobs at the volume level to alleviate fragmentation issues. Furthermore, each of these extents has to be tracked by various data structures and this uses additional space and causes processing and storage overhead. Certain embodiments automatically reorganize each data set into a smaller number of extents once the number of extents in a data set exceeds a threshold value.

Certain embodiments deal with the problem of the data sets growing beyond the size limits for a given storage group. Storage groups are generally allocated for data sets of a given size. The storage group assignment is based on the initial size of the data set. If the data set grows beyond the limit for the storage group, in certain embodiments appropriate operations are performed by checking the size of the data sets during a close operation on the data set, and by moving the data set to the appropriate storage group if needed.

Certain embodiments analyze the extent information corresponding to a data set when the data set is being closed, wherein the time at which the data set is being closed is referred to as the close time. If the number of extents is over a threshold, certain embodiments perform operations to consolidate extents by copying one or more data sets to a new location. Also at close time, if the inclusion of the data set into a storage group causes the size of the storage group to exceed a predetermined limit, the data set is moved to an appropriate group.

Exemplary Embodiments

Figure 1:
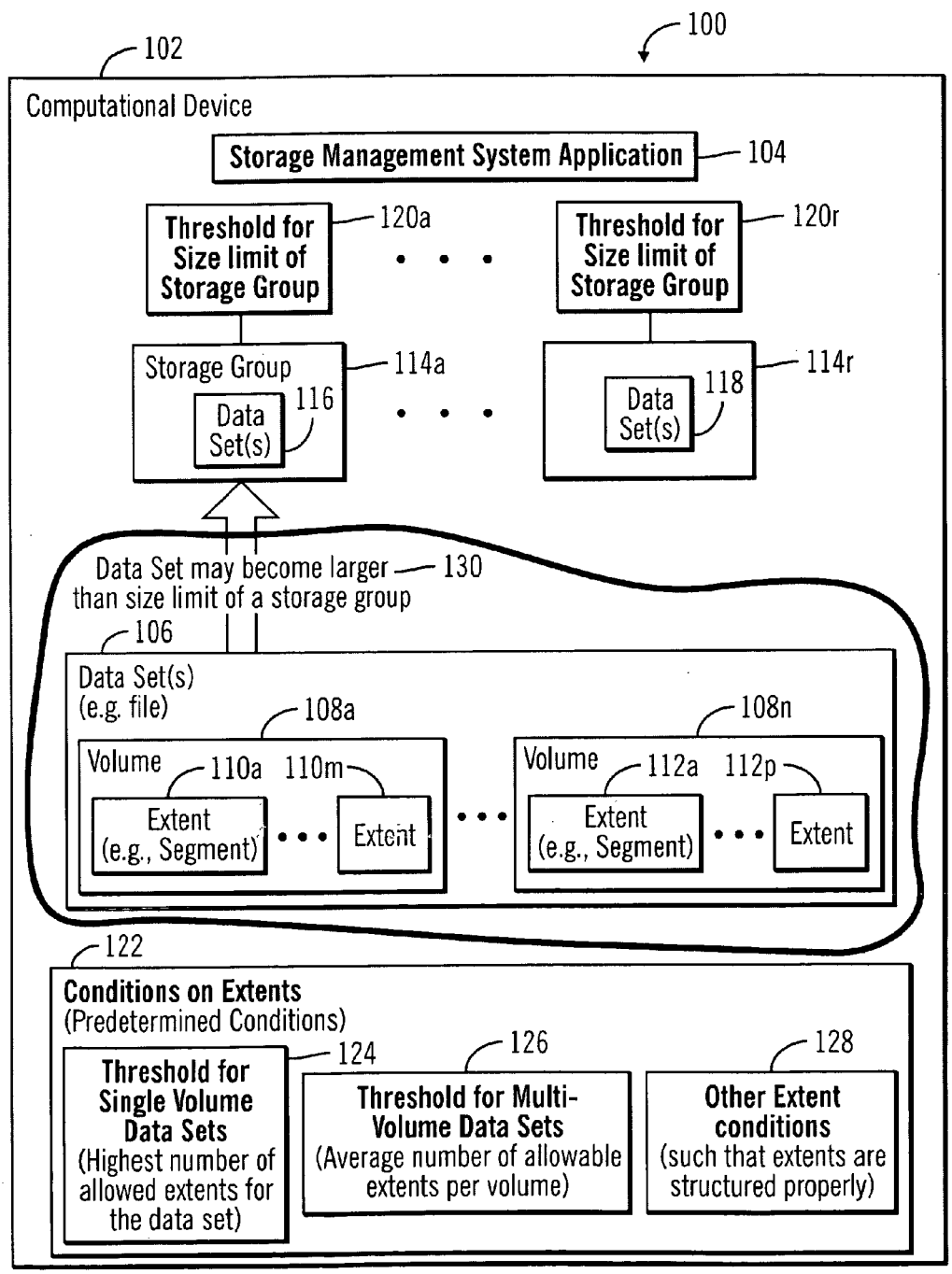
FIG. 1 illustrates a block diagram of a computational device included in a computing environment, in accordance with certain embodiments.

FIG. 1 illustrates a block diagram of a computing environment 100 in which a computational device 102 includes a storage management system application 104. The computational device 102 may comprise any suitable computational device known in the art, including a mainframe computer, a mini computer, a personal computer, a server, a client, a host, a telephony device, a storage controller, etc. The storage management system application 104 is an application that may be implemented in hardware, firmware, software or any combination thereof.

The storage management system application 104 maintains a plurality of data sets, wherein an exemplary data set 106 has been shown in FIG. 1. In certain exemplary embodiments, the data set 106 may be a file. The exemplary data set 106 may be stored in one or more volumes 108a . . . 108n, wherein the volumes 108a . . . 108n may be referred to as storage volumes. Each volume may include one or more extents. For example, volume 108a includes the extents 110a . . . 110m and volume 108n includes the extents 112a . . . 112p. The extents 110a . . . 110m, 112a . . . 112p may also be referred to as segments.

The storage management system application 104 also maintains one or more storage groups 114a . . . 114r, wherein each storage group is a grouping of more or more data sets. For example, exemplary data sets 116 may be grouped together by storage group 114a and exemplary data sets 118 may be grouped together by storage group 114r. In certain exemplary embodiments the data sets 116 grouped in the storage group 114a may include the data set 106, i.e., the data set 106 has been grouped with other data sets in the storage group 114a.

In certain embodiments, each storage group has a size limit, wherein the size limit is provided by an indicator referred to as a "threshold for size limit of storage group". For example, the indicator "threshold for size limit of storage group" 120a indicates the maximum size of the storage group 114a, and the indicator "threshold for size limit of storage group" 120r indicates the maximum size of the storage group 114r. In an exemplary embodiment, if the "threshold for size limit of the storage group" 120a is 700 Mbytes then the maximum size of the storage group 114a is 120 Mbytes and the aggregate storage requirements for data sets grouped by the storage group 114a cannot exceed 700 Mbytes in size. The thresholds 120a . . . 120r are maintained by the storage management system application 104.

In certain embodiments, the storage management system application 104 maintains a "conditions on extents" 122 data structure, wherein the "conditions on extents" 122 data structure provides certain constraints on the extents, wherein exemplary constraints are shown by reference numerals 124, 126, 128. For example, the reference numeral 124 indicates a threshold for single volume data sets 124, the reference numeral 126 indicates a threshold for multi-volume data sets 126, and the reference numeral 128 indicates other additional extent conditions. The threshold for single volume data sets 124 indicates the highest number of extents for any single volume data set that a user has specified. For example, a user may have specified that for a single volume data set the greatest number of extents is limited to be three hundred. The threshold for multi-volume data sets 126 indicates the average number of allowable extents per volume that a user has specified.

FIG. 1 shows (reference numeral 130) that a data set may become larger than the size limit of a storage group. In certain embodiments, a data set 106 is included in a different storage group when the data set 106 becomes larger than the size limit of a storage group 114a. Additionally, the data set 106 is reorganized when certain conditions on extents 122 are no longer satisfied.

Figure 2:
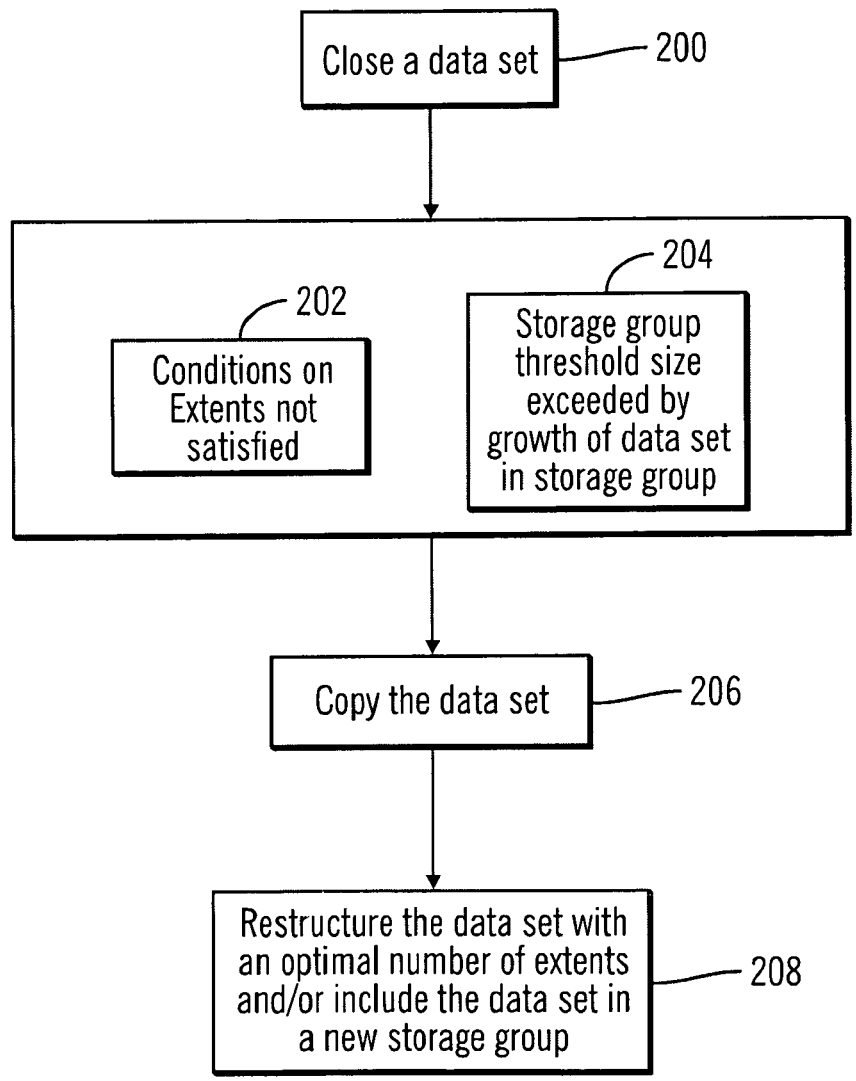
FIG. 2 shows a block diagram that shows restructuring of a data set or the inclusion of the data set in a new storage group, in accordance with certain embodiments.

FIG. 2 illustrates certain operations that are performed by the storage management system application 104 at the close time of a data set. Close time is a desirable time to review the characteristics of the data set, because at close time applications may have already used the data set and may cease to use the data set for a period of time. In certain exemplary embodiments, at the close time when a data set is being closed (reference numeral 200), the extent per volume limit is checked against the current number of extents per volume (reference numeral 202) and the current size of the data set is checked to determine whether inclusion of the data set would cause the storage group size limit to be exceeded (reference numeral 204). If either the current number of extents per volume or the storage group size limit is exceeded, then the storage management system application 104 copies the current data set and allocates a new data set with the same size and name as the current data set (reference numeral 206) and then restructures the data set (reference numeral 208). While restructuring the data set, the storage group is selected based several factors, one of the factors being the overall size of the data set. This causes the data set to be moved to the group that is appropriate for the size of data set. In certain embodiments, any new allocation is allocated in a single extent when possible. Thus by moving the data set, the extents may be consolidated.

For copying the data set, a data mover application that is included in the storage management system application 104 may use a fast replication method. As a result, the time for which the data set is unavailable to other applications is reduced. If other applications are still using the data set at the time when the storage management system application 104 tries to call the data mover, the data mover waits for the data set to become available, and moves the data set when the data set becomes available.

Therefore, FIG. 2 illustrates certain embodiments in which a data set is reorganized and/or is allocated to a different storage group at the close time of the data set.

Figure 3:
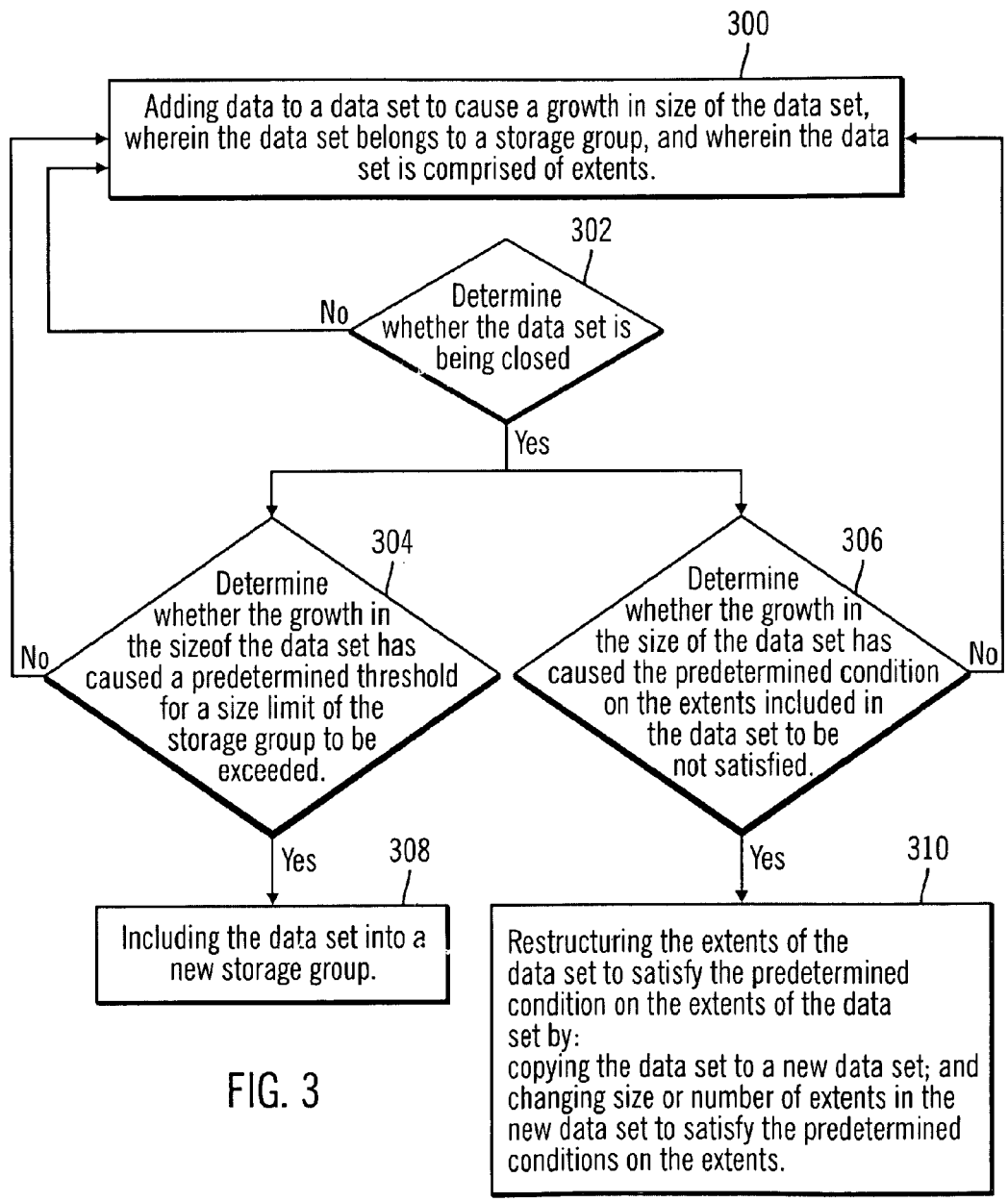
FIG. 3 illustrates a flowchart that shows operations performed in the computing environment of FIG. 1, in accordance with certain embodiments.

FIG. 3 illustrates a flowchart that shows operations performed in the computing environment 100 of FIG. 1, in accordance with certain embodiments. The operations shown in FIG. 3 may be performed by the storage management system application 104 included in the computational device 102 of the computing environment 100.

Control starts at block 300 in which the storage management system application 104 adds data to a data set (e.g., data set 106) to cause a growth in size of the data set, wherein the data set belongs to a storage group (e.g., storage group 114a), and wherein the data set is comprised of extents (e.g., extents 110a . . . 110m). The storage management system application 104 determines (at block 302) whether the data set is being closed. If so, control proceeds in parallel to blocks 304 and 306. If not, control returns to block 300 in which additional data may be added to the data set.

At block 304, the storage management system application 104 determines whether the growth in the size of the data set has caused a predetermined threshold for a size limit 120a of the storage group 114a to be exceeded. If so, the storage management system application 104 includes (at block 308) the data set into a new storage group. If not, the storage management system application 104 returns control from block 304 to block 300.

At block 306, the storage management system application 104 determines whether the growth in the size of the data set has caused the predetermined condition 122 on the extents included in the data set to be not satisfied. If so, the storage management system application 104 restructures (at block 310) the extents of the data set to satisfy the predetermined condition on the extents of the data set by copying the data set to a new data set, and by changing the size or the number of extents in the new data set to satisfy the predetermined condition on the extents.

In certain embodiments, a determination is made that the data set is a single volume data set, i.e., all extents of the data set are included in a single volume. A further determination is made that the predetermined condition on the extents is a threshold 124 that indicates a maximum number of allowable extents for the single volume data set, in response to determining that the data set is the single volume data set.

In yet further embodiments, a determination is made that the data set is a multi-volume data set, i.e., the extents of the data set span a plurality of volumes. A further determination is made that the predetermined condition on the extents is a threshold 126 that indicates an average number of allowable extents per volume, in response to determining that the data set is the multi-volume data set.

Therefore, FIGS. 1-3 illustrate certain embodiments in which a data set that has grown in size is restructured based on certain conditions on extents of the data set. Additionally, the data set is assigned to a new storage group if the growth of the data set causes the storage group to which the data set is assigned to exceed a predetermined threshold size.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk— read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 4:
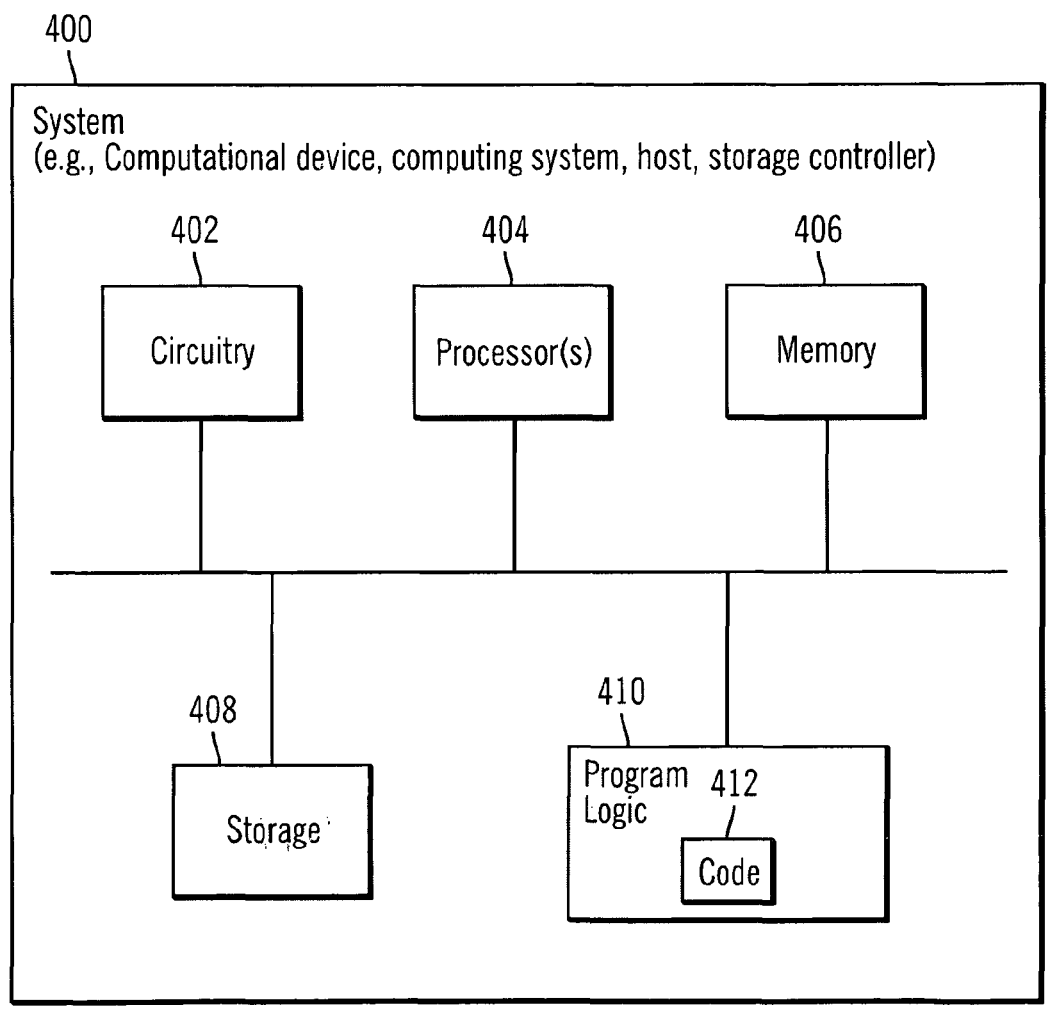
FIG. 4 illustrates a block diagram that shows certain elements that may be included in the computational device of FIG. 1, in accordance with certain embodiments.

FIG. 4 illustrates a block diagram that shows certain elements that may be included in the computational device 102 of FIG. 1, in accordance with certain embodiments. One or more of the computational devices 102 either individually or collectively may also be referred to as a system 400, and may include a circuitry 402 that may in certain embodiments include a processor 404. The system 400 may also include a memory 406 (e.g., a volatile memory device), and storage 408. The storage 408 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 408 may comprise an internal storage device, an attached storage device and/or a network accessible storage device. The system 400 may include a program logic 410 including code 412 that may be loaded into the memory 406 and executed by the processor 404 or circuitry 402. In certain embodiments, the program logic 410 including code 412 may be stored in the storage 408. In certain other embodiments, the program logic 410 may be implemented in the circuitry 402. Therefore, while FIG. 4 shows the program logic 410 separately from the other elements, the program logic 410 may be implemented in the memory 406 and/or the circuitry 402.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-4 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-4 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
adding data to a data set to cause a growth in size of the data set, wherein the data set belongs to a storage group, and wherein the data set is comprised of extents;
including the data set into a new storage group, in response to determining that the growth in the size of the data set has caused a predetermined threshold for a size limit of the storage group to be exceeded; and
restructuring the extents of the data set to satisfy a predetermined condition on the extents of the data set, in response to determining that the growth in the size of the data set has caused the predetermined condition on the extents included in the data set to be not satisfied, wherein restructuring the extents of the data set further comprises: copying the data set to a new data set; and in response to copying the data set to the new data set, changing number of extents in the new data set to satisfy the predetermined condition on the extents, and wherein the method further comprises:
determining that the data set is a multi-volume data set; and
determining that the predetermined condition on the extents is a threshold that indicates an average number of allowable extents per volume, in response to determining that the data set is the multi-volume data set.

2. The method of claim 1, the method further comprising:
determining that the data set is a single volume data set; and
determining that the predetermined condition on the extents is a threshold that indicates a maximum number of allowable extents for the single volume data set, in response to determining that the data set is the single volume data set.

3. The method of claim 1, the method further comprising:
determining that the data set is being closed, prior to including the data set into the new storage group; and
determining that the data set is being closed, prior to restructuring the extents of the data set.

4. The method of claim 1, wherein:
each of the storage group and the new storage group includes one or more data sets;
each of the one or more data sets is a file that includes one or more volumes; and
a volume of the one or more volumes includes a plurality of extents.

5. A system, comprising:
a memory; and
a processor coupled to the memory, wherein the processor executes operations, the operations comprising:
adding data to a data set to cause a growth in size of the data set, wherein the data set belongs to a storage group, and wherein the data set is comprised of extents;
including the data set into a new storage group, in response to determining that the growth in the size of the data set has caused a predetermined threshold for a size limit of the storage group to be exceeded; and
restructuring the extents of the data set to satisfy a predetermined condition on the extents of the data set, in response to determining that the growth in the size of the data set has caused the predetermined condition on the extents included in the data set to be not satisfied, wherein restructuring the extents of the data set further comprises: copying the data set to a new data set; and in response to copying the data set to the new data set, changing number of extents in the new data set to satisfy the predetermined condition on the extents, and wherein the operations further comprise:
determining that the data set is a multi-volume data set; and
determining that the predetermined condition on the extents is a threshold that indicates an average number of allowable extents per volume, in response to determining that the data set is the multi-volume data set.

6. The system of claim 5, the operations further comprising:
determining that the data set is a single volume data set; and
determining that the predetermined condition on the extents is a threshold that indicates a maximum number of allowable extents for the single volume data set, in response to determining that the data set is the single volume data set.

7. The system of claim 5, the operations further comprising:
determining that the data set is being closed, prior to including the data set into the new storage group; and determining that the data set is being closed, prior to restructuring the extents of the data set.

8. The system of claim 5, wherein:
each of the storage group and the new storage group includes one or more data sets;
each of the one or more data sets is a file that includes one or more volumes; and
a volume of the one or more volumes includes a plurality of extents.

9. A computer readable storage medium selected from a group consisting of a magnetic storage medium, an optical storage medium, a volatile storage medium, a non-volatile storage medium, a read only memory, a random access memory, and a solid state memory, wherein code stored in the computer readable storage medium when executed by a processor causes operations, the operations comprising:
adding data to a data set to cause a growth in size of the data set, wherein the data set belongs to a storage group, and wherein the data set is comprised of extents;
including the data set into a new storage group, in response to determining that the growth in the size of the data set has caused a predetermined threshold for a size limit of the storage group to be exceeded; and
restructuring the extents of the data set to satisfy a predetermined condition on the extents of the data set, in response to determining that the growth in the size of the data set has caused the predetermined condition on the extents included in the data set to be not satisfied, wherein restructuring the extents of the data set further comprises: copying the data set to a new data set; and in response to copying the data set to the new data set, changing number of extents in the new data set to satisfy the predetermined condition on the extents, and wherein the operations further comprise:
determining that the data set is a multi-volume data set; and
determining that the predetermined condition on the extents is a threshold that indicates an average number of allowable extents per volume, in response to determining that the data set is the multi-volume data set.

10. The computer readable storage medium of claim 9, the operations further comprising:
determining that the data set is a single volume data set; and
determining that the predetermined condition on the extents is a threshold that indicates a maximum number of allowable extents for the single volume data set, in response to determining that the data set is the single volume data set.

11. The computer readable storage medium of claim 9, the operations further comprising:
determining that the data set is being closed, prior to including the data set into the new storage group; and
determining that the data set is being closed, prior to restructuring the extents of the data set.

12. The computer readable storage medium of claim 9, wherein:
each of the storage group and the new storage group includes one or more data sets;
each of the one or more data sets is a file that includes one or more volumes; and
a volume of the one or more volumes includes a plurality of extents.

13. A method for deploying computing infrastructure, comprising integrating computer-readable code into a computing system, wherein the computer-readable code in combination with the computing system is capable of performing:
adding data to a data set to cause a growth in size of the data set, wherein the data set belongs to a storage group, and wherein the data set is comprised of extents;
including the data set into a new storage group, in response to determining that the growth in the size of the data set has caused a predetermined threshold for a size limit of the storage group to be exceeded; and
restructuring the extents of the data set to satisfy a predetermined condition on the extents of the data set, in response to determining that the growth in the size of the data set has caused the predetermined condition on the extents included in the data set to be not satisfied, wherein restructuring the extents of the data set further comprises: copying the data set to a new data set; and in response to copying the data set to the new data set, changing number of extents in the new data set to satisfy the predetermined condition on the extents, and wherein the computer-readable code in combination with the computing system is further capable of performing:
determining that the data set is a multi-volume data set; and
determining that the predetermined condition on the extents is a threshold that indicates an average number of allowable extents per volume, in response to determining that the data set is the multi-volume data set.

14. The method for deploying computing infrastructure of claim 13, wherein the computer-readable code in combination with the computing system is further capable of performing:
determining that the data set is a single volume data set; and
determining that the predetermined condition on the extents is a threshold that indicates a maximum number of allowable extents for the single volume data set, in response to determining that the data set is the single volume data set.

15. The method for deploying computing infrastructure of claim 13, wherein the computer-readable code in combination with the computing system is further capable of performing:
determining that the data set is being closed, prior to including the data set into the new storage group; and
determining that the data set is being closed, prior to restructuring the extents of the data set.

16. The method for deploying computing infrastructure of claim 13, wherein:
each of the storage group and the new storage group includes one or more data sets;
each of the one or more data sets is a file that includes one or more volumes; and
a volume of the one or more volumes includes a plurality of extents.

* * * * *